Oct. 14, 1924.

C. F. WAGNER 1,511,383

TROLLEY CONDUCTOR DEVICE

Filed Sept. 8, 1921

WITNESSES:

INVENTOR
Charles F. Wagner
BY
ATTORNEY

Patented Oct. 14, 1924.

1,511,383

UNITED STATES PATENT OFFICE.

CHARLES F. WAGNER, OF PITTSBURGH, PENNSYLVANIA, ASSIGNOR TO WESTINGHOUSE ELECTRIC & MANUFACTURING COMPANY, A CORPORATION OF PENNSYLVANIA.

TROLLEY-CONDUCTOR DEVICE.

Application filed September 8, 1921. Serial No. 499,298.

*To all whom it may concern:*

Be it known that I, CHARLES F. WAGNER, a citizen of the United States, and a resident of Pittsburgh, in the county of Allegheny and State of Pennsylvania, have invented a new and useful Improvement in Trolley-Conductor Devices, of which the following is a specification.

My invention relates to trolley-conductor systems and particularly to trolley-conductor systems comprising separately energized electrically isolated sections.

The object of my invention is to provide a system, of the above indicated character, that shall prevent a rush of current from one section to a section of lower voltage when the adjacent ends thereof are simultaneously engaged by passing trolleys.

In electric-railway trolley-conductor systems, in which successive sections are electrically isolated and energized from different sources of power or substations, considerable difficulty is sometimes encountered by the simultaneous engagement of the adjacent ends of the sections by a passing trolley. Any considerable difference of voltage between the sections, when the trolley connects the two sections, will cause a rush of current to the low-voltage section which will cause the station circuit interrupter on that side to open.

Attempts have been made to avoid this difficulty by placing the adjacent ends of the separately energized sections some distance apart so that they will not be engaged simultaneously by a passing trolley but, in single-phase transmission systems employing phase-converters on the locomotives, the back-voltage lag in the converter, caused by the momentary interruption of its circuit, causes a rush of current when the trolley engages the next section.

In practicing my invention, I provide a system in which the adjacent ends of the separate sections are bent laterally to provide sufficient insulating space and, at the same time, permit a pantograph trolley to engage the same simultaneously.

One of the sections is provided, adjacent to its end, with an air gap in shunt to which a current-limiting reactor, a resistor or a combination of both is connected. This arrangement prevents an undue rush of current to either section, regardless of the direction of approach of the trolley.

Figure 1:
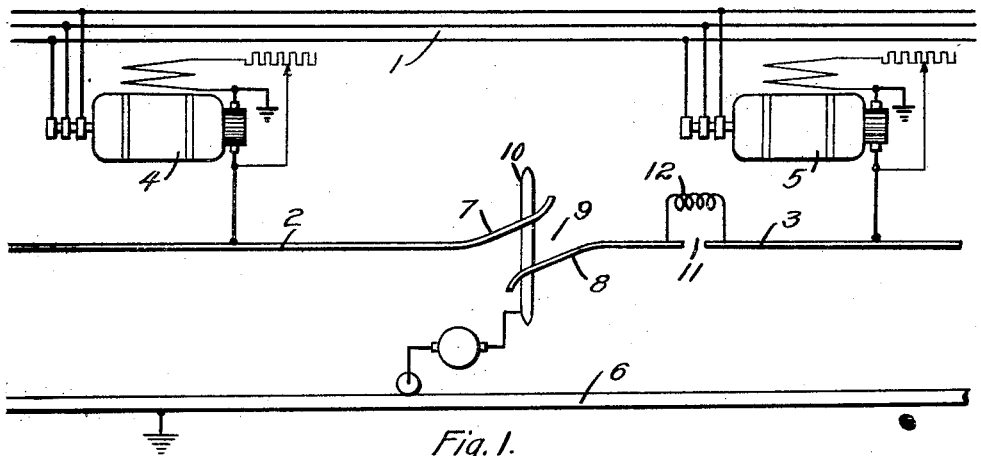
Figure 2:
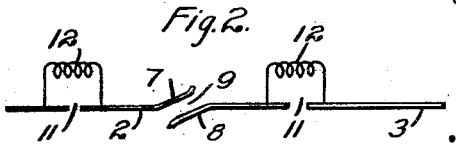
Figure 3:
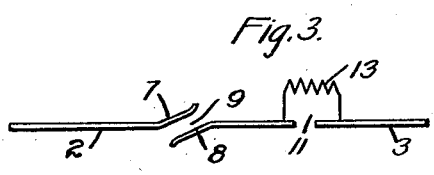
Figure 4:
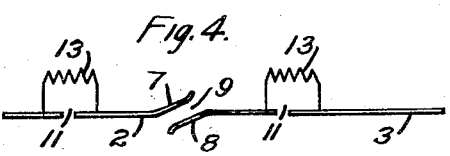
Figure 5:
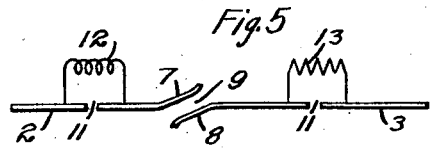
Figure 6:
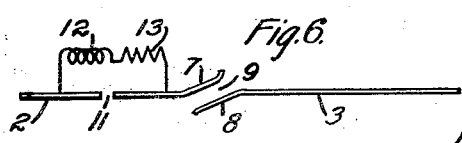
Figure 7:
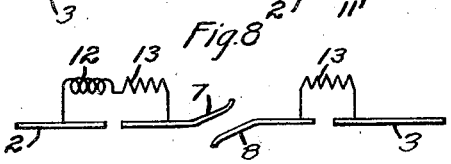
Figure 8:
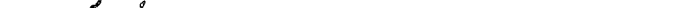

Figure 1 of the accompanying drawing is a diagrammatic view of a direct-current trolley-conductor system embodying my invention.

Figure 9:
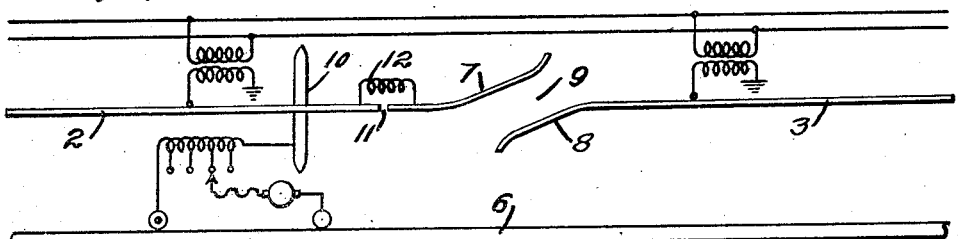

Figs. 2, 3, 4, 5, 6, 7 and 8 are detail diagrammatic views of adjacent trolley-conductor sections embodying modifications of my invention and Fig. 9 is a view, similar to Fig. 1, of an alternating-current trolley-conductor system embodying one form of my invention.

A direct-current trolley-conductor system embodying my invention may comprise the usual feeder conductors 1, spaced trolley-conductor sections 2 and 3, rotary converters 4 and 5 connected between the feeder conductors 1 and the trolley-conductor sections 2 and 3, respectively, and a return or track conductor 6.

The adjacent ends 7 and 8 of the trolley-conductor sections 2 and 3, respectively, are so laterally bent and arranged in overlapping longitudinal relation as to provide a break gap 9 therebetween and to present a smooth continuous underrunning contact surface to the shoe of a passing pantograph trolley 10 that, in passing the gap 9, will momentarily engage the ends 7 and 8 simultaneously.

Either or both of the sections 2 and 3 may be provided with an air gap 11, such as is shown in the section 3, around which a reactor 12 is connected.

In passing from section to section, if a difference of voltage exists between the sections, when the ends 7 and 8 are simultaneously engaged by the trolley 10, the reactor 12 will prevent a rush of current to the section of lower voltage.

The reactor 12 is normally inactive and only functions during the passage of a trolley over the break gap 9.

In Figs. 2 to 8, inclusive, are shown various combinations of reactors 12 and resistors 13 with the air gaps 11 by which similar results may be obtained.

Fig. 9 illustrates the use of one form of my invention in connection with an alternating-current trolley-conductor system.

Since it is surges of current against which my invention is adapted to protect the system, it is similarly adaptable for alternating and direct-current systems, as shown.

While I have shown and described particular forms of my invention, changes may be effected therein without departing from the spirit and scope thereof, as set forth in the appended claims.

I claim as my invention:

1. A trolley-conductor system comprising spaced sections adapted to be simultaneously engaged by a passing current collector and means for preventing the imposition of effects from one section to another during the engagement of said collector with a plurality of said sections.

2. A trolley-conductor system comprising separately energized sections adapted to be simultaneously engaged by a passing current collector, and means for preventing a rush of current from one section to another during the engagement of said collector with two adjacent sections when a difference of voltage exists between the sections.

3. A trolley conductor system comprising overlapping separately energized sections and means for preventing the imposition of effects from one section to another during the passage of a trolley.

4. A trolley-conductor system comprising separately energized sections and a current-retarding device connected in series with one of said sections and rendered active substantially only during the passage of a trolley from one section to the next.

5. A trolley-conductor system comprising spaced overlapping substantially end-to-end related trolley conductors, one of said conductors having an air gap therein, and current-limiting means connected across the gap.

6. A trolley-conductor system comprising spaced sections adapted to be simultaneously engaged by a passing current collector, at least one of said sections having a gap therein near the space between said sections, and current-limiting means bridging said gap.

7. A trolley-conductor system having adjacent sections energized at different potentials, and means for preventing a surge of current in either direction during the bridging of said sections by a passing current collector.

8. A trolley-conductor system comprising overlapping separated sections and means for preventing a rush of current from one section to another whenever the sections are temporarily bridged.

In testimony whereof, I have hereunto subscribed my name this 31st day of August, 1921.

CHARLES F. WAGNER.